United States Patent
Candelore (10) Patent No.: US 9,652,523 B2
(45) Date of Patent: May 16, 2017

(54) AGING OF FRIENDS IN SOCIAL NETWORK

(71) Applicant: SONY CORPORATION, Tokyo (JP)

(72) Inventor: Brant Candelore, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 399 days.

(21) Appl. No.: 14/476,064

(22) Filed: Sep. 3, 2014

(65) Prior Publication Data

US 2016/0063086 A1 Mar. 3, 2016

(51) Int. Cl.
*G06F 3/048* (2013.01)
*G06F 17/30* (2006.01)
*H04L 12/58* (2006.01)
*H04L 29/06* (2006.01)

(52) U.S. Cl.
CPC .. *G06F 17/30598* (2013.01); *G06F 17/30342* (2013.01); *G06F 17/30345* (2013.01); *G06F 17/30861* (2013.01); *H04L 51/12* (2013.01); *H04L 51/32* (2013.01); *H04L 65/403* (2013.01)

(58) Field of Classification Search
CPC .................................................. G06F 3/0481
See application file for complete search history.

(56) References Cited

U.S. PATENT DOCUMENTS

| | | | |
|---|---|---|---|
| 7,467,212 B2* | 12/2008 | Adams | G06F 9/468 709/206 |
| 2006/0085373 A1 | 4/2006 | Dhillion et al. | |
| 2007/0118802 A1* | 5/2007 | Gerace | G06F 17/30867 715/738 |
| 2009/0216859 A1 | 8/2009 | Dolling | |
| 2013/0054326 A1 | 2/2013 | Ross | |
| 2013/0238706 A1* | 9/2013 | Desai | H04L 67/306 709/204 |
| 2013/0246799 A1* | 9/2013 | Balinsky | H04L 9/3247 713/176 |

* cited by examiner

*Primary Examiner* — Matthew Ell
(74) *Attorney, Agent, or Firm* — John L. Rogitz (57) ABSTRACT

Social network relationships are "aged" in that if a social network friend has not communicated with a user's social network site in a certain amount of time, then the friend is downgraded to "acquaintance" level automatically. One result may be that the "acquaintance" does not see certain postings to the website. The "aging" setting can be programmable on the social networking site so that users can elect to employ the "aging" or not. The downgrading of social standing of people in social network allows a more streamlined and private way to communicate with those with whom the user has an on-going social network relationship. Similarly, based on aging, "close friends" can be automatically downgraded to just "friends". When the aging happens, the aged friend may be cut off from certain postings, mimicking a natural way that relationships evolve.

19 Claims, 4 Drawing Sheets

AGING OF FRIENDS IN SOCIAL NETWORK

I. FIELD OF THE INVENTION

The application relates generally to the aging of friends in a social network.

II. BACKGROUND OF THE INVENTION

A computer ecosystem, or digital ecosystem, is an adaptive and distributed socio-technical system that is characterized by its sustainability, self organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/of software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

SUMMARY OF THE INVENTION

An example ecosystem that is pertinent here is a social network. As understood herein, social networks allow people to "friend" other people, essentially creating their own community of computer users. As also understood herein, a person's list of friends can grow very, bat this is not a natural order of how people interact. Communicating with this group then becomes almost a public communication. While a common desire of social networks is to draw more people in and not to exclude anyone, and that various ways may be provided to treat certain "friends" people in different and more intimate ways than other friends, there is not a way to age a relationship that parallels normal human interaction.

Accordingly, a device includes at least one computer readable storage medium bearing instructions executable by a processor, and at least one processor configured for accessing the computer readable storage medium to execute the instructions to configure the processor for accessing a list of contacts of a social network computer page associated with at least one page administrator, and for reclassifying at least a first contact based at least in part on a period of inactivity related to the first contact.

In some examples, the instructions when executed by the processor configure the processor for, responsive to the reclassifying, altering a level of social contact of the first contact. The instructions when executed by the processor may configure the processor for altering the level at least in part by permitting the first contact to access only public postings on the social network computer page. In addition or alternatively, the instructions when executed by the processor may configure the processor for altering the level at least in part by disallowing messaging through the page to and/or from the first contact. In addition or alternatively, the instructions when executed by the processor may configure the processor for altering the level at least in part by preventing fee first contact from viewing posts on fee page, in addition or alternatively, the instructions when executed by the processor may configure the processor for altering the level at least in part by unfollowing a social network page administered by the first contact.

In some examples, the list includes at least first and second categories of contacts and the instructions when executed by the processor configure the processor for presenting on a display a user interface (UI) with at least first and second selectors respectively corresponding to reclassifying contacts in the first and second categories of contacts based at least in part on a period of inactivity.

In example embodiments, the instructions when executed by the processor configure the processor for presenting on a display a user interface (UI) with at feast first and second selectors respectively corresponding to first and second event categories from which to measure fee period of inactivity. In some examples, the instructions when executed by the processor configure die processor for presenting on a display a user interface (UI) with at least first and second selectors respectively corresponding to first and second periods of inactivity.

In another aspect, a device includes at least one computer readable storage medium bearing instructions executable by a processor to configure the processor for automatically aging at least a first social network contact (SNC) responsive to the first SNC not having communicated with an administrator's social network site for a predetermined period, and responsive to the aging, downgrading a level of access to social network site accorded to the first SNC. The downgrading may be effected at least is part by preventing the first SNC from viewing certain postings to the website. The instructions when executed by the processor can configure the processor for receiving input from the administrator to establish the automatically aging.

In another aspect, a method includes receiving input from an administrator of a social network computer page to alter a level of access of at least a first contact of the page based at least in part on predetermined inactivity related to the first contact, and based at least in part on the input and responsive to a determination that the predetermined inactivity has been satisfied, automatically altering the level of access.

The input may define whether to automatically alter the level of access for any contact of the page, and/or the input may define a first contact category subject to automatically altering the level of access, with the first contact category being among a group of plural contact categories, in addition or alternatively the input can define the level of access and/or the predetermined inactivity and/or a period associated with the predetermined inactivity. The method can include presenting, on a display a user interface (UI) with at one selector selectable to establish the input.

The details of the present invention, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating, environments may be used to execute one or more browsing programs, such as a browser made by Microsoft or Google or Mozilla or other browser program that can access web applications hosted by the internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that cars execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical, blocks, modules, and circuits described below can be implemented or performed with a general, purpose processor, a digital signal processor (DSP), a field programmable gate array (FPGA) or oilier programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not hunted to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). However, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Figure 1:
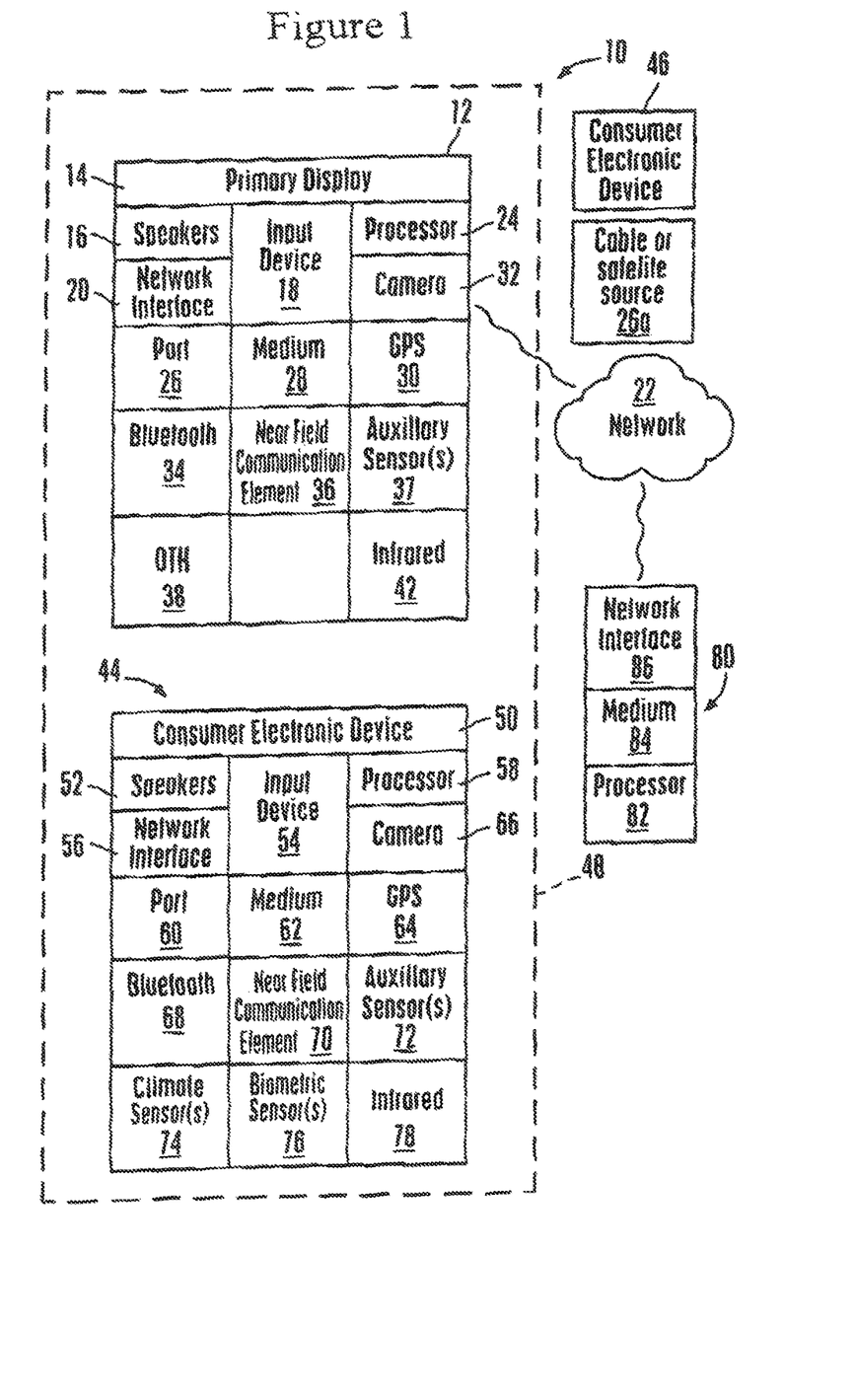
FIG. 1 is a block diagram of an example system including an example in accordance with, present principles.

Accordingly, to undertake such principles the AVDD 12 can be established by some or all of the components shown in FIG. 1. For example, the AVDD 12 can include one or more displays 14 that may be implemented by a high definition, or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more tangible computer readable storage medium 28 such as disk-based or solid state storage, in some cases embodied in the chassis of the AVDD as standalone devices or as a personal video recording device (PVR) or video disk player either internal or external to the chassis of the AVDD for playing back AV programs. Also in some embodiments, the AVDD 12 can include a position or location receiver such as hut not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include an over-the-air TV broadcast port 38 for receiving OTH TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer, and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVDD 12, or it may be a more sophisticated device such as a tablet computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interlaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with, present principles. Also included on the first CE device 44 may be a Bluetooth transceiver 68 and other Near Field Communication (NFC) element 70 for communication with other devices using Bluetooth and or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the AVDD 12 through any of the above-described communication modes and related components.

The second CE device 46 may include some or all of the components shown for the CE device 44.

Now in reference to the afore-mentioned at least one server 80, it includes at least one server processor 82, at least one tangible computer readable storage medium 84 such as disk-based or solid state storage, and at least one network interlace 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
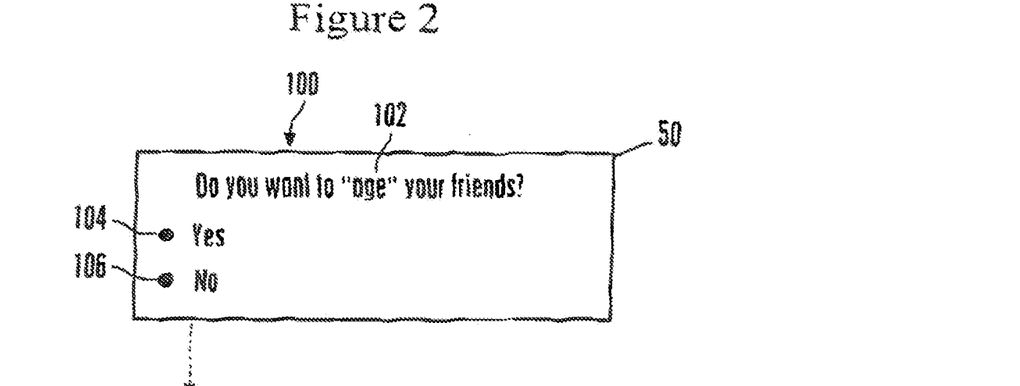
FIGS. 2-6 are screen shots of example user interfaces (UI) according to present principles.

Now referring to FIG. 2, a user interface (UI) is generally labeled 100 and is illustrated as it may be presented to the user on display 50 under the control of the processor 58 of the first CE device 44. An interrogative text element 102 asks the user whether to "age" the user's friends. The user may choose selectable element "Yes" 104, thus instructing the processor 58 to alter the level of access the friend or group of friends has in relation to the whole or various components of the user's page. When a user ages one or more friends, the level of access the friend(s) has can be diminished. The user may also choose a selectable element "No" 106, thereby causing the processor 58 not to diminish the level of access of one or more friends.

Figure 3:
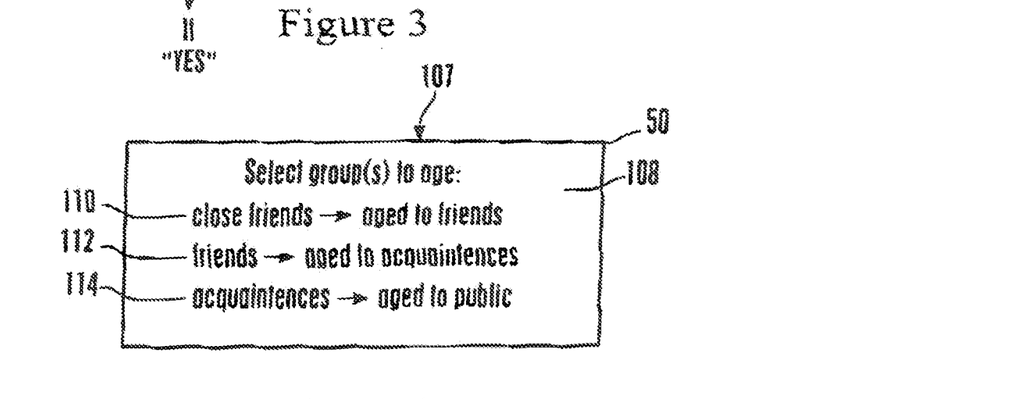

Now referring to FIG. 3, if the user chooses selectable element "Yes" 104, a second UI generally labeled 107 may be presented to the user on the display 50. Given that the user desires to age his/her friends, the user may instruct the processor 58 which group or groups of friends to age. The UI 107 may be presented to the user with a title element 108 that asks the user to select a group of friends that is desired to be aged. In this embodiment, four levels of access are illustrated and will be discussed below. There may be fewer or more than four levels of access.

By choosing selectable element 110, the user may instruct the processor 58 to age the user's "close friends" to a lower level of access, "friends." By choosing selectable element 112, "friends" may be aged to "acquaintances." By choosing selectable element 114, "acquaintances" may be aged to "public." The action of aging any group or members within that group reduces the level of access to the user's social media information. Determination of the parameters of access granted to aged group members are discussed below.

Figure 4:
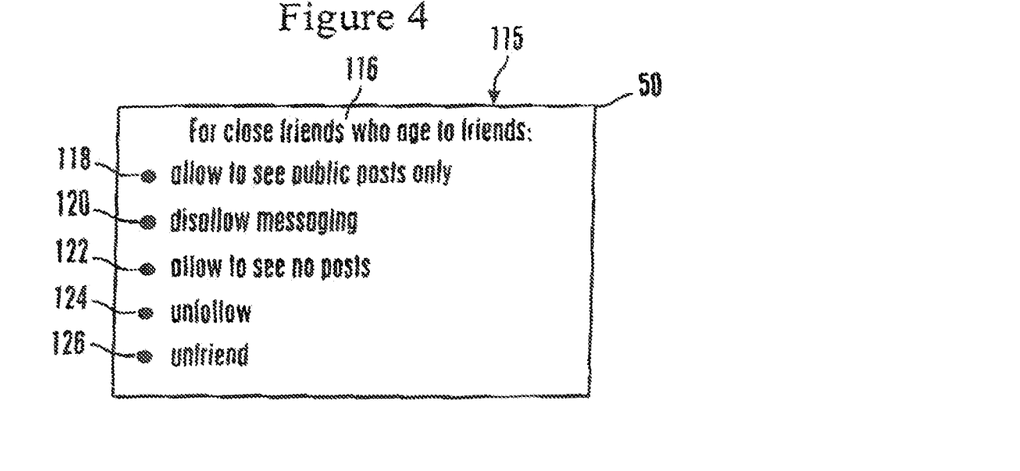

FIG. 4 illustrates a UI 115 presented on display 50 that demonstrates how a user may choose to define the parameters of the levels of access granted to various groups during an aging process. In this embodiment, a title text element 116 prompts the user to specify parameters for close friends who are being aged to the level of friends. The processor 58 may respond to the user's selections of parameters by altering the level of access to the social media page according to those selected parameters.

A selectable element 118 is selectable to cause the level of access for close friends that are being aged to friends to be allowance to see public posts only. A selectable element 120 is selectable to cause the level of access for close friends that are being aged to friends to be a disallowance of chat messaging to and/or from the user. A selectable element 122 is selectable to cause the level of access for close friends that are being aged to friends to be disallowance to see any posts of the user, whether public or private. A selectable element 124 is selectable to cause the level of access for close friends that are being aged to friends to cause the user's social network page to no longer follow the social media page of the aged friends. A selectable element 126 is selectable to cause the level of access for close friends that are being aged to friends to be reset to that of a public-only level of access, thereby unfriending the aged friends.

While the UI 107 of FIG. 3 demonstrates the user's ability to determine which members of the social media user to age, the UI 115 of FIG. 4 illustrates the user's ability to determine the aging process, i.e. to diminish the level of access to desired parameters, e.g. unfriend, of the members selected in the UI 107.

Figure 5:
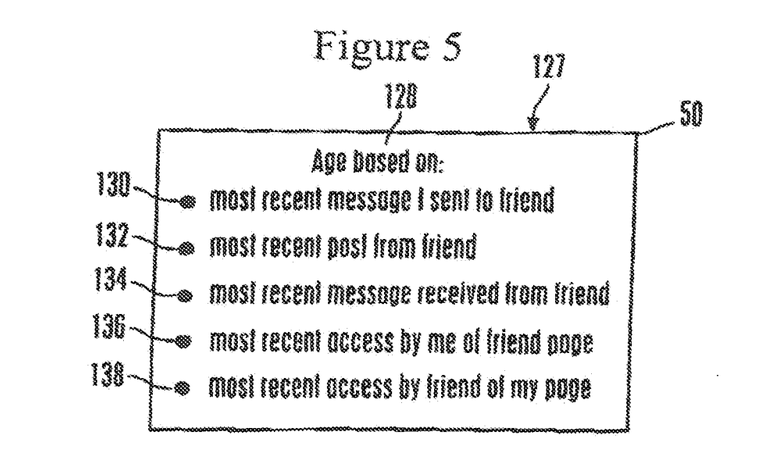

Moving in reference to FIG. 5, another UI 127 is illustrated and may be presented on the display 50 under the control of the processor 58. The activity of the user and social contacts may represent limitations on which age may be based as described in UI 127, indicated by a title text element 128. The user may choose to base the decision to age another member of the social media community on the most recent message sent from the user to the member by activating, whether by clicking using a mouse or a finger as in a touch-screen display, a selectable element 130. In this embodiment, the member that is under consideration is a friend. However, the same limitations discussed herein on which age can be based may be applied to members with alternative levels of access, e.g. acquaintances.

A selectable element 132 may be activated by the user, thereby causing the processor 58 to base the aging process on the most recent post from one or plural friends. By activating a third selectable element 134 from the list, the processor 58 can base the aging process on the most recent message received from one or more friends. The user may choose to base the aging process on the most recent access by the user of the social media page belonging to the one or plural friends under consideration by activating selectable element 136. Alternatively, the user may choose to base the aging process on the most recent access by the one or plural friends of the user's social media page by activating selectable element 138.

Figure 6:
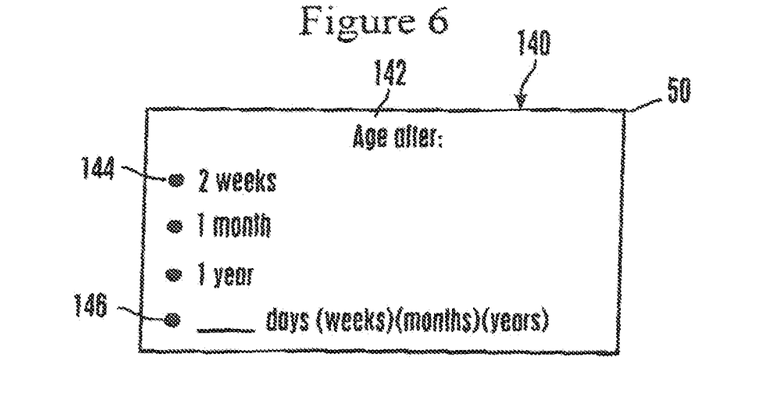

In addition to activity-related limitations on which age may be based described above in FIG. 5, age may also at least in part be based on elapsed time parameters, described and illustrated here by the UI 140 in FIG. 6. The UI 140 may be presented to the user on display 50 under the control of the processor 58 and can include a title text element 142 indicating the topic of the UI 140 is related to aging social media contacts after a specific elapsed time.

Below the "Age after:" title text element 142, a selectable element 144 can be presented to and activated by the user, thereby causing the processor 58 to age the social media contact(s) after two weeks. In this embodiment, additional, unlabeled elapsed time parameters that are included under the title text element 142 are one month and one year. Moreover, the user may choose to define a specific period of elapsed time not listed under title text element 142 by inputting, whether by keyboard, touch-screen keypad, etc., a number into an input field 146 and selecting a unit of measurement, e.g. days, weeks, months, years.

Figure 7:
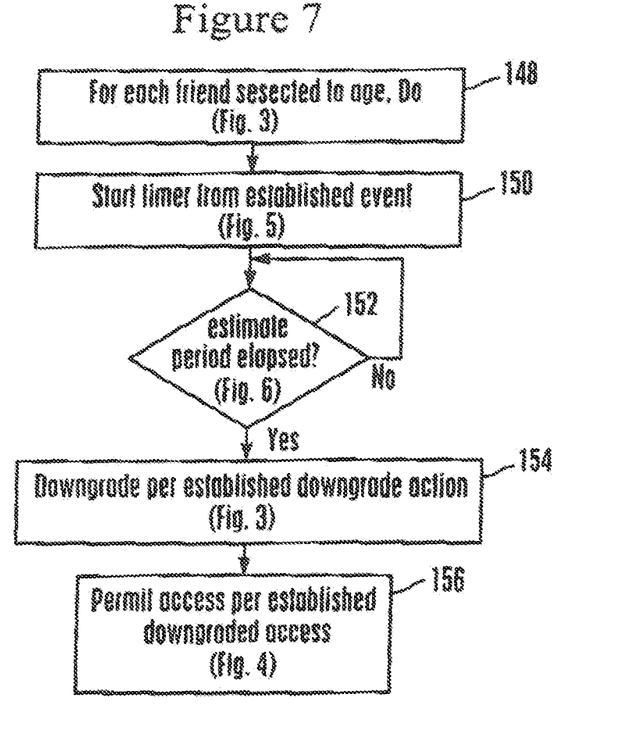
FIG. 7 is a flow chart of example logic according to present principles.

Moving in reference to the flow chart illustrated in FIG. 7, example logic begins at block 148 wherein the processor 58 may execute instructions for each friend, the user selected to age (as described above in FIG. 3). The processor 58 can control a timer that starts as a consequence of an established event at block 150. The possible established events in this embodiment were discussed above in the description of FIG. 5.

The processor 58 may then determine whether an established time period has elapsed (described above in the description of FIG. 6) at decision diamond 152. A determination by the processor 58 that the time period as established by the user has not elapsed may result in the example logic returning to the previous step in example logic, i.e. the start of decision diamond 152. The processor 58 can continue this process of repeatedly executing the instructions pertaining to decision diamond 152 until it is determined that the established period of time has elapsed.

Subsequent to a determination that an established period of time has indeed elapsed, example logic continues to block 154, wherein the processor 58 may execute instructions pertaining to the aging process as defined by the user. In other words, the level(s) of access applying to one friend or plural friends under consideration may be downgraded according to the downgrade actions defined by the user. Continuing to block 156, as a result of the aging process, the processor 58 may permit the access of recently aged social media contacts according to the downgraded level of access criteria established by the user.

It will be appreciated that whilst present principals have been described with reference to some example embodiments, these are not intended to be limiting, and that various alternative arrangements may be used to implement the subject matter claimed herein.

What is claimed is:

1. A device comprising:
at least one computer storage that is not a transitory signal and that comprises instructions executable by at least one processor for:
accessing a list of contacts of a social network computer page associated with at least one page administrator;
reclassifying at least a first contact based at least in part on a period of inactivity related to the first contact; and
presenting on a display a user interface (UI) with at least first and second selectors respectively corresponding to first and second event categories from which to measure the period of inactivity.

2. The device of claim 1, wherein the instructions are executable for:
responsive to the reclassifying, altering a level of social contact of the first contact.

3. The device of claim 2, wherein the instructions are executable for:
altering the level at least in part by permitting the first contact to access only public postings on the social network computer page.

4. The device of claim 2, wherein the instructions are executable for:
altering the level at least in part by disallowing messaging through the page to and/or from the first contact.

5. The device of claim 2, wherein the instructions are executable for:
altering the level at least in part by preventing the first contact from viewing posts on the page.

6. The device of claim 2, wherein the instructions are executable for:
altering the level at least in part by unfollowing a social network page administered by the first contact.

7. The device of claim 1, wherein the list includes at least first and second categories of contacts and the instructions are executable for:
presenting on a display a user interface (UI) with at least first and second selectors respectively corresponding to reclassifying contacts in the first and second categories of contacts based at least in part on a period of inactivity.

8. The device of claim 1, comprising the at least one processor.

9. The device of claim 1, wherein the instructions are executable for:
presenting on a display a user interface (UI) with at least first and second selectors respectively corresponding to first and second periods of inactivity.

10. A device comprising:
at least one computer storage comprising instructions; and
at least one processor for accessing the storage to execute the instructions for:
automatically aging at least a first social network contact (SNC) responsive to the first SNC not having communicated with an end user's social network site for a predetermined period;
responsive to the aging, downgrading a level of access to social network site accorded to the first SNC according to at least one aging rule;
presenting on an output device at least a first input element operable by the end user to select from members of the social network site which members of the social network site to subject to the automatically aging such that not all members of the social network site are subject to the automatically aging; and presenting on the output device at least a second input element operable by the end user to determine the at least one aging rule.

11. The device of claim 10, wherein the instructions when executed by the processor configure the processor for:

executing the downgrading at least in part by preventing the first SNC from viewing certain postings to the website.

12. The device of claim 10, wherein the instructions when executed by the processor configure the processor for:

receiving input from the administrator to establish the automatic aging.

13. A method comprising:

receiving input from an administrator of a social network computer page to alter a level of access of at least a first contact of the page based at least in part on predetermined inactivity related to the first contact;

based at least in part on the input and responsive to a determination that the predetermined inactivity has been satisfied, automatically altering the level of access; and presenting on a display a user interface (UI) with at least first and second selectors respectively corresponding to first and second event categories from which to measure a period of the predetermined inactivity.

14. The method of claim 13, wherein the input defines whether to automatically alter the level of access for any contact of the page.

15. The method of claim 13, wherein the input defines a first contact category subject to automatically altering the level of access, the first contact category being among a group of plural contact categories.

16. The method of claim 13, wherein the input defines the level of access.

17. The method of claim 13, wherein the input defines the predetermined inactivity.

18. The method of claim 13, wherein the input defines a period associated with the predetermined inactivity.

19. The method of claim 13, comprising presenting on a display a user interface (UI) with at least one selector selectable to establish the input.

\* \* \* \* \*